United States Patent [19]
Hori et al.

[11] 3,819,128
[45] June 25, 1974

[54] AUTOMATIC SHUT-OFF DEVICE FOR A TAPE RECORDER

[75] Inventors: Yasushi Hori, Tokyo; Kesao Shindou, Yokohama, both of Japan

[73] Assignee: Tokyo Shibaura Electric Co., Ltd., Kawasaki-shi, Japan

[22] Filed: Dec. 28, 1971

[21] Appl. No.: 212,935

[30] Foreign Application Priority Data

Dec. 30, 1970 Japan........................ 45-133828[U]

[52] U.S. Cl. ...................... 242/189, 242/198, 360/96
[51] Int. Cl. ........................ G03b 1/02, G11b 15/13
[58] Field of Search ...... 242/191, 186, 57; 274/4 R, 274/4 A, 4 B, 4 C, 4 D, 4 E, 4 F, 4 G, 11 R, 11 A, 11 B, 11 C

[56] References Cited

UNITED STATES PATENTS

| | | | |
|---|---|---|---|
| 2,676,212 | 4/1954 | Williams | 242/57 X |
| 3,248,066 | 4/1966 | Andrews | 242/204 |
| 3,434,725 | 3/1969 | Eibensteiner | 274/4 R |
| 3,582,013 | 6/1971 | Beretta | 242/191 |
| 3,609,844 | 10/1971 | Ichikawa | 242/189 |
| 3,677,493 | 7/1972 | Beretta | 274/4 C |

*Primary Examiner*—Harry N. Haroian
*Attorney, Agent, or Firm*—Kemon, Palmer & Estabrook

[57] ABSTRACT

Automatic shut-off device for a tape recorder comprises a movable plate movably mounted on a main chassis and having a magnetic head mounted thereon, means for locking the movable plate at a predetermined operating position upon pushing an operation lever and means for releasing the lock of the movable plate which is actuated by a tape tension applied to at the end of the tape.

2 Claims, 5 Drawing Figures

PATENTED JUN 25 1974

3,819,128

SHEET 2 OF 2

AUTOMATIC SHUT-OFF DEVICE FOR A TAPE RECORDER

BACKGROUND OF THE INVENTION

The present invention relates to an automatic shut-off device for a tape recorder, particularly a portable cassette type tape recorder.

The prior art automatic shut-off devices used in the tape recorder include one type where a pre-recorded signal or metal foil adhered at the end portion of a magnetic tape is electrically detected and the detected signal is then used to actuate a relay or solenoid thereby halting the tape run and another type where the end of the magnetic tape is fixed to a reel and a tension applied on the tape at the end of the tape is used to actuate a micro-switch, the closure of which in turn energizes the relay or the solenoid. In the abovementioned prior art device, however, a large current is necessary to actuate the relay or the solenoid and hence power consumption of a battery is large in a battery operated cassette type tape recorder.

SUMMARY OF THE INVENTION

It is an object of the present invention to provide an automatic shut-off device for a tape recorder which effects the halt of the tape run mechanically without electrical elements.

In accordance with the automatic shut-off device of the present invention, there is movably mounted on a main chassis a plate having a magnetic head thereon so as to move jointly with an operation lever. Spring means storing energy therein is required the reset to movable plate and a release lever in accordance with the movement thereof is arranged in conjunction with the main chassis and the movable plate. A locking means is provided for the movable plate, at a record or playback position, which has been moved to said position upon pushing of the operation lever. The locking means is actuated by a release means which is operated by a tension applied to the tape end upon completion of the tape winding to release the locking means. Upon releasing the locking means the movable plate is reset by the energized spring means to halt the tape run.

With the above arrangement, since no electrical element is included in automatically halting the tape run, the power consumption of the battery incorporated in the tape recorder is considerably reduced.

DETAILED DESCRIPTION OF THE INVENTION

Figure 1:
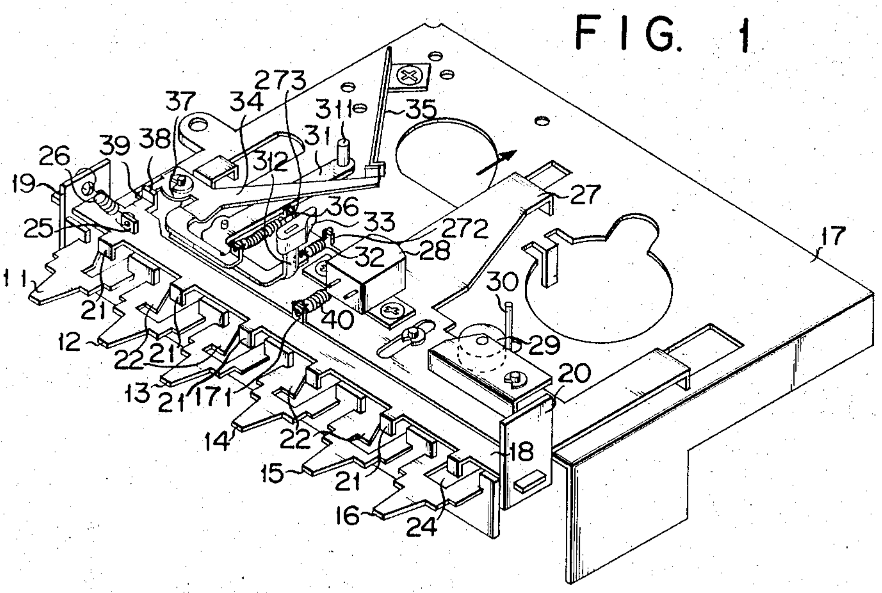
FIG. 1 is a perspective view of the automatic shut-off device for the tape recorder of a preferred embodiment according to the present invention.
Figure 2:
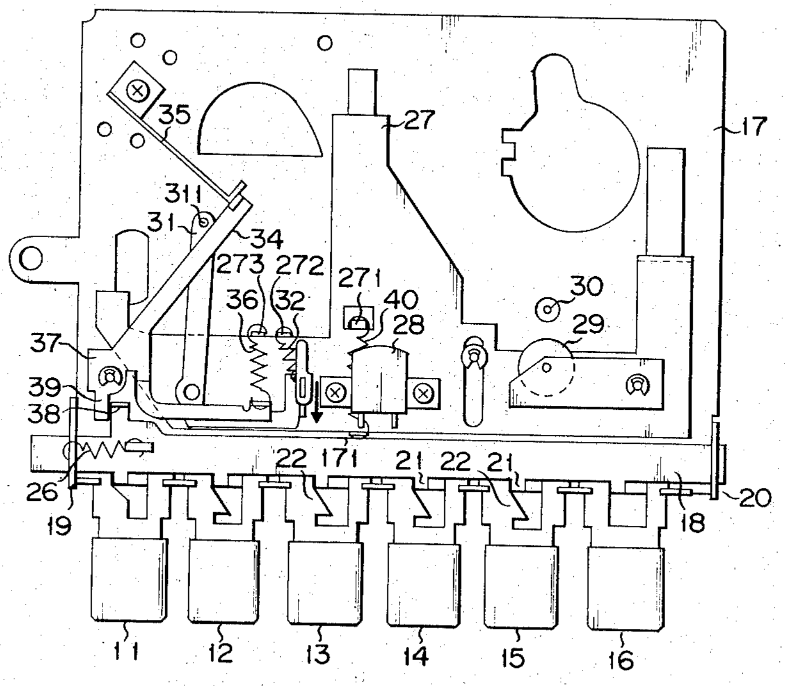
FIG. 2 shows a plan view of the automatic shut-off device of FIG. 1.

Referring to FIGS. 1 and 2, operation levers 11 to 16 for stop, fast forward, record, playback, rewind and eject operations, respectively are slidably juxtaposed on the front side of a main chassis 17 in a forward and backward direction. A lock lever 18 is horizontally slidably mounted on support members 19, 20 projecting upwardly from both sides of the front of the main chassis 17. At the front edge of the lock lever 18 there are provided bent pieces or members 21 whose ends abut against side walls of grooves formed in the operation levers. The levers 12 to 15 also carry saw-tooth members 22. The lock lever 18 is normally biased to the left by a coil spring 26 mounted between the support member 19 and a projection 25 on the lock lever 18.

A plate 27 is mounted on the main chassis 17 so as to move in a forward and backward direction jointly with the operation lever. The movable plate 27 is normally biased forward by an extension spring 40 mounted between a projection 171 on the main chassis 17 and a projection 271 on the movable plate 27. A magnetic head 28 is secured at the center of the movable plate and a pinch roller 29 is mounted on the right side of the movable plate 27. The pinch roller 29 is disposed in opposing relation to a capstan 30 projecting upwardly through the main chassis so as to press against the capstan 30 upon the pushing of the operation lever. An L-shaped detection lever 31 is pivotably mounted at its curved portion on the left side of the movable plate 27. An extension spring 32 is mounted between one end of the detection lever 31 adjacent to the magnetic head 28 and a projection 272 on the movable plate 27. Upon the top of a member 312 projecting upwardly from the detection lever 31 there is mounted a tension detection member 33. On the other end of the detection lever 31 there is provided a pin or rod 311 that is arranged to abut against an elastic stopper 35 mounted on the main chassis 17. A substantially V-shaped release member 34 is pivotably mounted at its curved portion 37 upon the left side of the front portion of the main chassis 17. One end of the release lever 34 abuts against the tip end of the elastic stopper 35 and the other end is springloaded by an extension spring 36 mounted between a projection member 273 on the movable plate 27 and the end of the release lever 34. The curved portion 37 of the lever 34 is provided with a projection 39 which abuts against a member 38 mounted on the lock lever 18.

The operation of the automatic shut-off device of the present invention will now be described.

Figure 3:
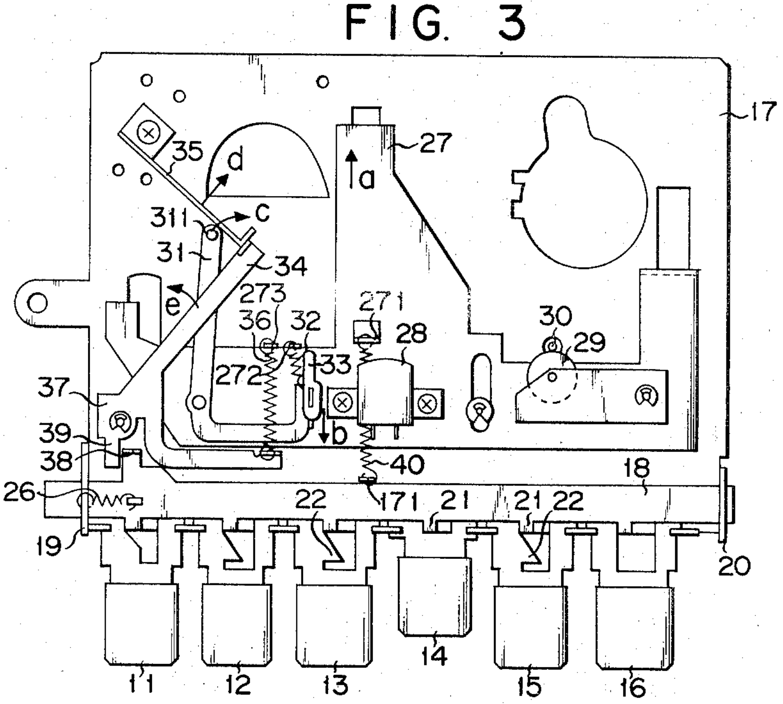
FIG. 3 shows a plan view of the automatic shut-off device in its operating position.

When the playback operation lever 14 is pushed as shown in FIG. 3, the movable plate 27 is moved backward, that is, in the direction of the arrow *a* and locked in a predetermined playback operation position. The locking operation is effected by the engagement of the member 21 mounted on the lock lever 18 with the top of the saw-tooth member 22. In this position the extension springs 36 and 40 are expanded whereby energy is stored in these springs corresponding to a restoring force for the movable plate 27 and a pivotal force for the release lever 34. Under such a condition, when the winding of a magnetic tape loaded in the tape recorder reaches the end of the tape that is fixed to a reel, a tension is applied to the tape, which tension acts on the tension detection member 33 so as to move same in the direction of the arrow *b* (FIG. 3). As a result the detection lever 31 is pivoted in the direction of the arrow *c* so that the pin or rod 311 causes the tip end of the stopper 35 to become disengaged from the release lever 34. The release lever 34 is then pivoted in the counterclockwise direction e under the action of the spring 36, which causes the actuator member 39 to move the lock lever to the right. This rightward movement of the lock lever 18 permints the disengagement of the member 21 out the saw-tooth member 22 to reset the movable plate together with the operation lever 14 to the stop position by the restoring force stored in the spring 40.

As seen from the above description the mechanism is reset to the stop position without any electrical parts, by the actions of the springs 36 and 40 which store restoring forces by being expanded at the time of operation. Thus it is understood that the power consumption of a battery is considerably reduced.

Figures 4, 5:
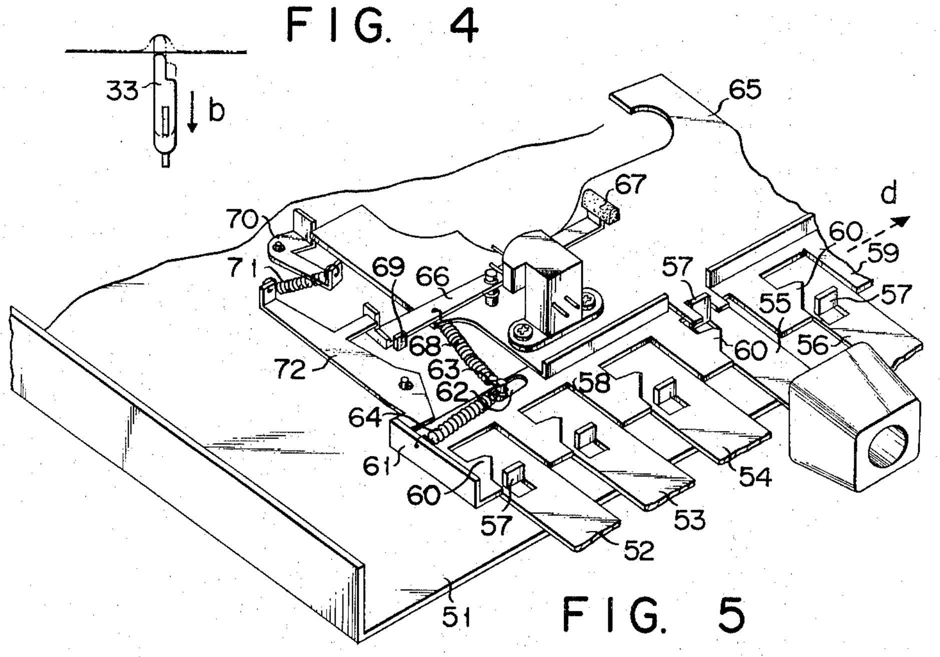
FIG. 4 illustrates a relation between a tape and a detection member.
FIG. 5 is a perspective view of another embodiment of the automatic shut-off device of the present invention.

Another embodiment of the present invention will now be described with reference to FIG. 5. There are movably mounted in the forward and backward direction on a main chassis 51 operation levers 52 to 56 for record, playback, fast forward, rewind and stop operation. Each of the operation levers 52 to 56 has a projection member 57 formed thereon. A lock lever 59 having cutouts 58 formed at positions corresponding to respective operation levers is horizontally slidably mounted above the operation levers 52 to 56. Each of the cutouts 58 has a saw-tooth member 60 formed therein to be operatively mated with the projection 57 formed on the operation lever. An extension spring 64 is positioned between the side member 61 of the lock lever 59 and a support pin 63 projecting from the main chassis 51 through a slot 62 formed in the lock lever 59. The lock lever 59 is normally biased in the direction of the arrow *d* by the spring 64.

A movable plate 65 having a magnetic head 28 and a pinch roller, not shown, thereon is movably mounted on the main chassis 51 so as to move in the frontward and backward direction jointly with the movement of the record and playback operation levers 55 and 56. Pivotably mounted on the movable plate 65 is a tension detection lever 66, the ends of which are bent upwardly, and at one end thereof there is provided a detection member 67 adapted to abut against a tape. A tension spring 68 is mounted between a suitable position on the detection lever and the front edge of the movable plate 65 to bias the detection lever 66 in counterclockwise direction. This biasing force is normally resisted by a stopper 69 mounted on the main chassis 51 to abut against the end of the detection lever 66. An L-shaped lever 70 is pivotably mounted on the main chassis 51 near the rear corner of the movable plate 65. A release lever 72 is pivotably mounted on the main chassis 51. The release lever 72 has a center projection abutting against the end of the detection lever 66. One end of the L-shaped member 70 is coupled through an extension spring 71 with one end of the lever 72. The other end of the lever 72 abuts against the side member 61.

The operation of the embodiment illustrated above is now described. Upon pushing the play operation lever 55, for example, the movable plate 65 is moved into the play position and locked in the play position by the action of the lock lever 59 and the projection member 57 formed on the operation lever 55. At this time, the end of the L-shaped lever 70 is engaged by the rear corner of the movable plate 65 to pivot the lever 70 in counterclockwise direction. As the lever 70 is pivoted the extension spring 71 is expanded and a pivoting force for the release lever 72 is stored in the spring 71. Under such a condition, when the tape reaches its end the detection lever 66 is pivoted in clockwise direction against the tension of the spring 68 under the action of the tension applied to the tape. As the detection lever 66 is pivoted the central projection of the release lever 72 is disengaged from the end of the detection lever 66, and the release lever 72 is pivoted in a clockwise direction by the force of the spring 71. The pivotal movement of the member 72 causes the actuation of the lock lever 59 in the direction opposite to the arrow *d* by the other end of the member 72 for releasing the lock of the actuator lever 55 and resetting the movable chassis 65 to the stop position.

With the arrangement described above, automatic stop of the tape recorder is effected by the use of the spring without any electrical element thereby power consumption of the tape recorder is considerably reduced.

What is claimed is:

1. An automatic shut-off device for a cassette type tape recorder comprising, a plurality of operation levers slidably juxtaposed on a main chassis, a movable plate disposed on the main chassis and moved to its operating position jointly with the movement of at least one of said operation levers, a lock lever disposed on the main chassis and slidable in a direction perpendicular to the direction of movement of the operation lever and normally biased in a predetermined locking direction by a spring mounted between the lock lever and the main chassis, said lock lever being linked further with said operation lever for locking the movable plate at said operating position, a release lever pivotly mounted on the main chassis and engagable with said lock lever for moving said lock lever in a direction opposite to said locking direction to reset said tape recorder, a release means comprising a spring mounted between said movable plate and said release lever, said spring means storing resetting force upon the movement of the movable plate to said operating position, a resilient stopper member engagable by said release lever for retaining said release lever in a predetermined position, and a detection lever pivotly mounted on said movable plate and actuated by the tension of a magnetic tape upon completion of the tape winding, one end of said lever receiving the tension of the tape and the other end of said lever being adjacent to said stopper member so as to disengage said stopper from said release lever.

2. The automatic shut-off device for a tape recorder according to claim 1 wherein said operation levers have locking abutments and said lock lever is normally biased in said predetermined lateral direction relative to said main chassis by said spring and movably mounted thereon and includes abutments for engaging with the locking abutments of said operation levers and is movable by said release lever in unlocking direction opposite to said predetermined lateral direction.

* * * * *